June 14, 1932.   J. J. WEBER   1,862,875
SURFACE ORNAMENTATION AND METHOD OF PRODUCING SAME
Filed June 4, 1928
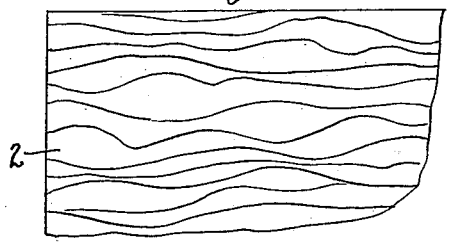
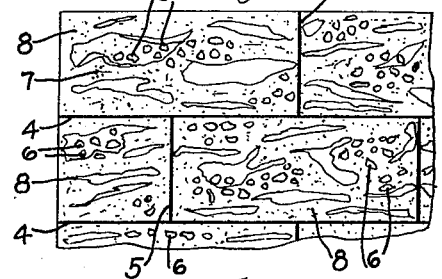
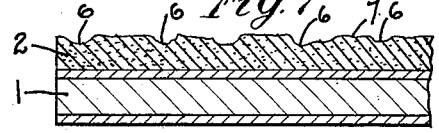
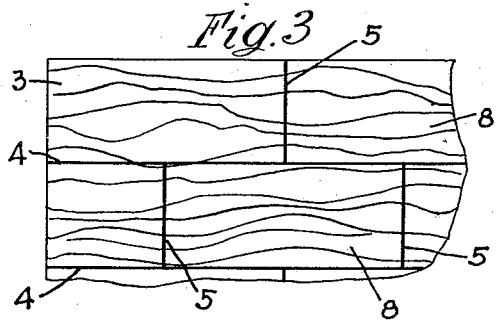
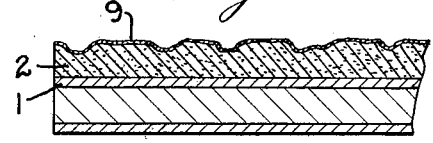
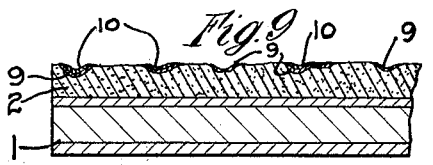
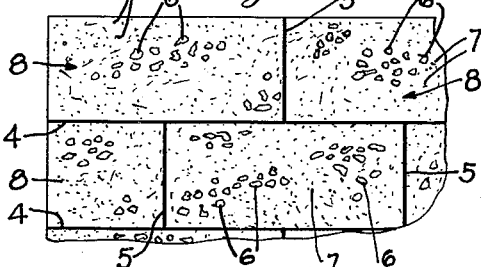
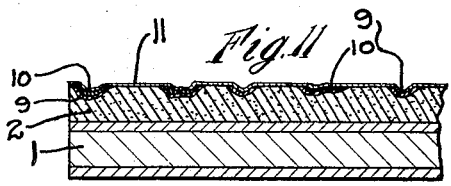
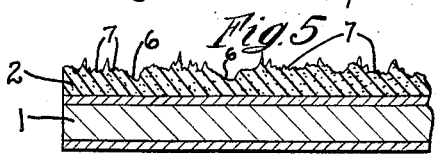
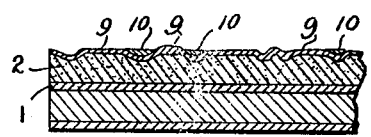
Inventor
John J. Weber
by Frank J. Schraeder Jr.
Attorney Patented June 14, 1932

1,862,875

UNITED STATES PATENT OFFICE

JOHN J. WEBER, OF WILMETTE, ILLINOIS, ASSIGNOR TO J. H. JOCHUM, JR., OF CHICAGO, ILLINOIS

SURFACE ORNAMENTATION AND METHOD OF PRODUCING SAME

Application filed June 4, 1928. Serial No. 282,676.

The invention relates to improvements in a method of producing wall material of ornamental character, particularly that of a stone, the surface of which has more or less numerous irregular depressions. These cavities or pores may be crowded together in greater or smaller density in groups interspersed with irregular other marks which either simulate cracks, pores or the like, or which simulate the surface conditions due to volcanic origin of the mineral. A natural mineral of this kind is known by the name of travertin and its use for building purposes is well known.

The present invention has as an object a method of producing artificially in plastically applied material surface conditions resembling those of travertin or other minerals of similar character.

It is also an object of the invention to provide a method of producing in ornamental surface material the irregular graining or marking similar to that encountered in some natural stones and which becomes so characteristic of the natural stone when the same has been worked to present a smooth and even surface.

Another object of the invention is, therefore, to provide a method of creating in artificial stone material, an irregular variation of tints in colors and shades extending over the surface in irregular streaks.

Another object of the invention is to provide a product of great artistic possibilities suitable for wall decoration and adapted to take the place of slabs of natural stone and to present an even surface with numerous irregular cavernous areas, the coloring of which is more or less at a contrast with the coloring of the less cavernous interspersed portions of the surface.

Another object of the invention is to produce an article of manufacture which may be combined with any of the numerous types of wall board known in the market to present a novel highly decorative artistic appearance and which may be incorporated with other building elements in the same manner in which the wall boards themselves may be incorporated therewith.

With these and numerous other objects in view, a method of producing this article has been described in the following specification by way of example. The accompanying drawing illustrates diagrammatically various stages in the manufacture of the product in accordance with the method. In the drawing:

Figure 1 is a top plan view of a portion of a wall board showing the first step in the application of a composition in accordance with the present invention.

Figure 2 is a longitudinal sectional view of the same.

Figure 3 is a top plan view of the same wall board after being provided with separating grooves.

Figure 4 shows a top plan view of the wall board in another stage of manufacture.

Figure 5 is a longitudinal section through the same wallboard in the same stage shown in Figure 4.

Figure 6 is a top plan view of this wall board again in a more advanced stage of manufacture.

Figure 7 shows a longitudinal enlarged section through a portion of the wall board shown in Figure 6.

Figure 8 is a longitudinal enlarged section showing the application of the first coat of glazing material.

Fig. 8a is a longitudinal enlarged section showing the second coat of glazing material applied over the first coat.

Figure 9 is a similar longitudinal section showing part of the first coat of glazing material removed from the high spots or areas and a second coat of glazing material applied to the deeper crevices.

Figure 10 is a similar section to that shown in Figure 9 after the sanding operation, and Figure 11 is a longitudinal section of the finished product.

Natural stone of the type which it is desired to imitate by the present method is characterized by irregularly distributed pores or blowholes, owing to its volcanic origin. The numerous cavities have irregular outlines and size, and when the stone is cut to present an even surface they appear on this surface in irregular alteration with more or less smooth surface portions. The latter again indicate by their very coloring and the presence of numerous small cracks and openings that this irregular porous texture extends throughout the body of the stone.

Stone of this type is used in modern architecture owing to its decorative value, on the façades of buildings or in the interior, particularly for great rooms, lobbies, halls, and the like of public buildings, hotels and similar structures. Travertin is frequently set in place in the form of relatively large blocks.

The present invention aims at the production of a large decorative surface element having the appearance of the outer surface of an assembly of stones of this kind.

As a carrier or support for holding the artificial mass applied in the form of a flat layer, a wall board 1 of any desired composition is being used. A paste of a material previously prepared preferably as described below is applied to the surface of this wall board 1 in the form of a relatively thick coating 2, and this coating should not be uniform in shade and coloring over the entire surface.

The production of the base 2 to be applied to the surface of the wall board 1 by a trowel or in some other form is of great importance. It is necessary that the surface of the board shows different shades varying from white or cream color to a light tan and even to a dark gray with many neutralizing pastel shades of different colors irregularly spread in between these lighter and darker tan shades. In order to produce this base layer 2 it is, therefore, necessary to incorporate coloring material with the main ingredients of plastic nature which lend themselves to the application by a trowel.

The material to be applied to the wall board to form the body of the new product may be of any desired or suitable combination, but is preferably a mixture in which the base liquid referred to in a copending application, Serial No. 273,764, filed April 28, 1928, supplies the moisture for such plastic composition.

The base liquid is produced from a mixture of water containing flour with pure linseed oil. For instance, nine pounds of suitable rye flour, Ankor brand, are introduced in a mixing can and while the mixing machine is operating, twenty-four pounds of boiling water are slowly added to the same to make a heavy thick paste. The temperature while adding the water to the flour may be in the neighborhood of 105° to 110° F. To thin up this paste forty-eight pounds of water are then added at a temperature of 70° F. and thoroughly mixed, to make the base smooth and eliminate the lumps. Twenty pounds of pure linseed oil (boiled) of a temperature of 68° to 70° F. are added to this thin paste and mixed for one minute.

The mass 2 in general is produced by a mixture of whiting with this base liquid in the proportion of fourteen pounds of suitable whiting, to one gallon or eight pounds of the base liquid.

The base material in the form of a paste produced in this manner serves as carrier for the coloring material which is mixed with the same. The irregularly streaked appearance of area portions in different slightly contrasting or harmonizing shades is produced by incorporating with the base material different coloring materials, each coloring material requiring a batch of the base material paste to be mixed therewith. In the following reference is made to a travertin which has six of these varying color shades more or less neutralized and spread over areas which may merge into each other irregularly. These batches may be preferably produced as follows:

1. 53.5 pounds of base material and 2 oz. of Van Dyke brown well mixed with each other.
2. 53.5 pounds of base material and about ½ oz. of each of the following coloring materials; raw sienna, ultramarine blue, caput mortuum red.
3. 53.5 pounds of base material mixed with 1 oz. of each; Van Dyke brown and burned umber.
4. 53.5 pounds of base material mixed well with about 1 oz. of caput mortuum red.
5. 53.5 pounds of base material, about ½ oz. of ochre well mixed.
6. About 9 pounds of base material with about 1 oz. of each of the following; Van Dyke brown, caput mortuum red.

This last named mixture owing to the relatively smaller proportion of the whiting paste compared with the coloring material will then produce a somewhat darker batch to be spread together with other batches on the board.

The batches of these coloring pastes are then formed into one pile without, however, affecting an intermixture of the various batches with each other. The workingman then removes with the trowel suitable quantities from this pile from any desired place thereon. Since the individual coloring batches are not mixed with each other certain area portions will have approximately the same shade or color and these may be successively produced on the wall board.

The mass will show, when finished, particularly upon suitable distribution of the pastes, over irregular areas of the carrier a streaked or grained appearance, resembling in the coloring and in the different layer formation very closely the natural appearance of this decorative stone material.

It is advisable to apply the pastes in more or less regularly distributed spots and fill in the spaces remaining between these spots so that the entire surface of the board is ultimately covered with this coating. Owing to this application of the coating by means of a trowel or in some other suitable way in spots and then filling in the spots by the same material, the appearance of the surface tones will be far from uniform without, however, showing extreme contrasts at the different points to which the coating has in this manner been successively applied.

It is sometimes preferred to apply this coating 2 in separated stripes as for instance stripes of a width of several inches extending partly or wholly over the board 1 and after having partly covered thereby the surface of the board with this coating, apply coating also to the interspaces left free during the first stage of application. This will produce a very pronounced natural variation of the surface over the entire area thereof without, however, producing unnatural contrasts in the coloring of the surface since the natural stone also is not provided with heavily contrasting color areas.

After application of this coating of the pastes 2 to the wall board 1, the surface of the coating is slightly roughened preferably by pulling the trowel in a wavy manner over the surface while the latter is still moist or plastic, as shown in Figure 1. The surface 3 will then be uneven, but the coating 2 is still in plastic condition and may readily be evened or worked in some other way.

Having produced in this manner through the surface treatment a wavy surface effect of the mass 2, the flat trowel is pulled lengthwise over the surface. As the coating is then still sufficiently plastic the entire surface will not be smoothened to a great extent, but will be evened only and remain slightly rough on its surface.

While the mass is still in this tractable condition, it is divided by grooves 4, 5 so as to present an assembly of more or less large regular stone squares, as often seen in building walls made of travertin, limestone, or other natural stone. This ruling or subdivision of the mass may be produced by grooving the surface in a manner which is clear by reference to Fig. 3 where the limitation joints between neighboring stones are indicated at 4 and 5.

Subsequent to this treatment the base mass 2 is permitted to stand for a relatively short time to set somewhat. Depending upon the composition of the mass applied to the wall board this time may not be more than twenty minutes although this period is indicated here by way of example only.

After the grooved material has been permitted to set, as for instance for a period of twenty minutes, a heavy roughening is applied to its surface, as shown in Fig. 4. This may be done in any of the numerous ways known to the decorator working in similar material or in paints, or any other treatment may be selected for roughening the surface irregularly and altering the previous surface condition to produce irregular projections and depressions by using fibre brushes in connection with bristle brushes. Frequently a roughening is applied by forcing the tips of brushes directly against the moist surface, the points of the bristles thereby entering the moist material for displacing same and producing depressions. The effect is enhanced by the subsequent withdrawal of the brush in irregular movements from the moist material so that portions of the material are pulled outward away from the depressions.

The surface as seen in cross section would then be somewhat as indicated in Fig. 5 while the distribution of the numerous irregular depressions 6, 7 is indicated in Fig. 4, which are irregular in depth as well in their lateral area. It is obvious that depending upon the coarseness and stiffness of the brush used for roughening the holes and other surface irregularities adjacent thereto will vary in character. It is also obvious that in general the areas where these roughening treatments are to be applied in reference to the several "stone blocks" 8 must be dictated by the artistic sense of the producer. The proper arrangement of these roughened areas will contribute to the "natural" effect of the entire assembly produced.

By taking a scraper and going with it lightly over the roughened surface lengthwise subsequent to this first somewhat roughening operation, the higher projections will be leveled down and drawn lengthwise to take away the round hole effect to elongate and make the holes irregular, but it is not desired to smoothen the surface completely by means of this scraper treatment. The effect of the movement of the scraper over the plastic material after the roughening treatment will be that the mass presents a large number of irregularly distributed pores representing pressed down air holes as found in real travertin but not an absolutely smooth surface.

The nature of the individual stone to be imitated again may make it necessary to apply the scraper to the imitation stones 8 separately, that is going from any of the grooves 4, 5 to the opposite groove line, to enhance thereby the contrasting effect between the different stones 8. A movement of the scraper over the entire surface might produce a blurring effect with certain formations running into an adjacent stone 8, since the projections produced by the roughening treatment would then all be wiped in the same direction and this would detract from the natural appearance of the stone compound.

The effect of this imitation may then be still more improved by drawing a flat elastic scraper with a slight uneven pressure over the entire surface of the coating while the latter is still in plastic condition. This is merely to smoothen this surface and to facilitate subsequent treatment; see Figs. 6 and 7.

The sequence of treatments of the coating with scrapers will obviously cause some of the plastic material to enter into the grooves 4 and 5 produced for imitating the joints between adjacent blocks 8. Before any further treatment is applied the grooves 4, 5 should be restored to their original condition, that is, the material wiped into the same will have to be cleaned out with a pointed tool.

The coating 2 has now a fairly smooth upper surface. It is firmly combined with its carrier, the wall board 1, and it is now left standing for sufficient time to become hard by evaporation and oxidation. Depending upon the composition of the coating this setting time may take several days, but on the average a period of twenty-four to forty-eight hours will suffice. This process may be artificially forced.

When the coating has become nearly dry the process is continued by applying additional coloring necessary to impart to the finished product the glaze which characterizes such stones used for decorative purposes. When it is desired to produce imitation travertin a first coating of glazing material is applied by a brush or the like to form the ground on which additional material is to be applied later. This glaze coating is made up of a paint having a suitable sizing to assure its adherence to the lower coat, and its purpose is to emphasize the impressions more strongly by darkening same.

The proper shade of travertin has been found by experience to be producible by using a paint containing as base liquid that liquid which is described in the copending application and referred to above.

One gallon of this base liquid comprising the mixture of water, flour and oil is mixed at a temperature of 150° F. with one-fourth pound of Mapico black to produce the first ingredient of the coating. Another coloring material to weaken the grayish tone of this mixture is added in the form of one-fourth pound of English red. A second ingredient of the glaze coating is formed of a mixture of one gallon of a suitable base liquid with one gallon of starch liquid, which starch liquid is composed of one-half pound of starch in three gallons of boiling water.

The two ingredients comprising the base liquid with the coloring material in it, and the base liquid with the starch sizing are then thoroughly mixed together and this glazing 9 is applied to the entire surface of the board, as shown in Fig. 8. With a standard board one-half gallon of this mixture of the two ingredients will suffice for coating the entire area. This coating may be applied with a brush. As there is always some excess color visible in the material, this glazing, after having been applied, is wiped off the surface with a clean cheese cloth. This will smoothen the surface and remove the excess of color, disturbing the uniformity of the thin film of glazing remaining thereon. The glazing then forms a transparent layer through which the original material is visible, the glazing having the effect of enhancing the blending of the colors in the mass and eliminating all high contrasts which otherwise might detract from the "natural" appearance of the stone.

The first glazing not only very thinly covers the smooth surface of the mass applied to the board but also has entered the cavities which lend the stone the characteristic appearance. In the natural stone, however, some pores or cavities appear much darker than others. In order to produce the same dark background for these cavities a second glazing containing a darker coloring is applied on the first glazing. But while the first glazing had been spread over the entire surface of the imitation slabs the second coating is limited to those areas on which it is desired the cavernous portions should appear more prominent and darker.

The second glazing 10 likewise is a mixture of two ingredients of which the second one again comprises a gallon of the base liquid heretofore referred to, combined with the same starch containing liquid. The first ingredients consist of a gallon of the base liquid mixed at a temperature of 150° F. with one pound of Mapico black, the coloring material being added slowly while the mixture is being briskly stirred.

The two ingredients of the second glazing are thoroughly mixed and the mixture is applied to the areas containing the deep or cavernous recesses, as shown in Fig. 9. Approximately one pint of this mixture will suffice for the areas of the standard wall board.

The second glazing 10 may, therefore, appear in irregular blotches on the surface and the two glazings 9 and 10, are then permitted to dry for about 24 to 48 hours.

A sanding machine as for instance a drum sander may then remove the excess coloring and rough material from the higher surface areas of the applied composition, leaving these higher areas comparatively smooth, as shown in Fig. 10, at the same time producing sharp edges around the cavities which results in more prominently accentuating the undercut portions around the edges of the cavities. Depending upon the amount of the excess material, the sander may be caused to remove more or less of this material. Ordinarily, however, a single passage of the board through a drum sander will suffice.

The waste left by the sander is then completely removed through a treatment of the board with brushes and air to eliminate all particles of coloring material which may have adhered to the boards. The peculiar soft texture which is so characteristic of travertin is then presented.

The grooves 4 and 5 may have dark coloring material irregularly distributed thereon to imitate the individual stones or slabs which appear to be joined together. The effect of the texture is then enhanced by applying a coating of a flat lacquer 11 to the entire surface of the board, to make it very serviceable and more sanitary than real travertin, as shown in Fig. 11.

While in the above specification the product of a porous stone of a certain structure and of the travertin variety of shades has been described, it is obvious that upon selection of suitable color or upon selecting a predetermined coloring batch to predominate in its application to the surface, entirely different stone structures may be produced and it is not desired to limit the claims and scope of the invention to the specific embodiment to which reference has been made.

I claim:

1. In a process of making artificial stone, the steps of producing different colored batches of a plastic material, combining the batches into a single pile without mixing the same, and applying irregular portions from said pile over irregular areas of a carrier until the entire surface of the carrier is coated with said mass and with the surface which is to constitute the front surface of the product exposed, roughening portions of the said surface of the mass while still in plastic condition and letting it harden.

2. In a process of making artificial stone the steps of applying plastic masses of different colors or shades over the surface of a carrier by troweling it thereon, eliminating the uneven surface effect produced by the troweling while the masses are still plastic, grooving the surface of the entire mass in accordance with a predetermined pattern, roughening the mass over irregular areas approximately determined by the pattern produced through the grooving and smoothening the area portions confined by the grooving severally.

3. In a process of making artificial stone, the steps of applying a plurality of plastic masses containing different coloring materials over the entire surface of a carrier, grooving the surface of the masses while they are still in plastic condition, roughening the surface of the masses after grooving over irregular surface portions, the location of which is approximately determined by the grooving, letting the resulting mass harden and glazing the hardened surface thereof with certain cavities produced by the roughening operation in a coloring different from the other roughened area portions of the surface.

4. In a process of making artificial stone, the steps of applying a plurality of plastic masses containing a different coloring materials over the surface of a carrier to produce a streaky appearance of the surface, grooving the applied masses while still plastic, roughening the same and partially smoothening the masses after roughening and grooving, letting it harden, glazing the hardened mass over the entire surface thereof, and applying a differently colored glazing additionally over certain cavities produced by the roughening operation.

5. In a process of making artificial stone, the steps of applying a plurality of plastic masses containing different coloring materials over the surface of a carrier while preventing the sameness in appearance over the entire surface to which the mass has been applied, roughening irregularly the applied surface at irregular areas irregularly distributed thereover, smoothening portions of the surface which has been roughened without removing the holes produced thereby, hardening the mass and applying successively coats of different glazing material to the entire surface and to the roughened surface portions only respectively of the entire surface.

6. A process of making artificial stone, including the steps of applying a plastic mass made up of batches each containing a different coloring material over the entire surface of the carrier while maintaining a streaky effect on the surface, grooving the surface in accordance with a predetermined pattern, roughening the surface in accordance with the pattern produced by the grooving, smoothening portions of the surface in the various area portions confined by the grooving, letting the mass harden, applying a glazing to the entire surface of the smoothened mass, removing the glazing partly to leave a thin film only of this glazing through which the streaky appearance of the surface is visible, applying a darker glazing to the area portions which have cavities of different depths therein owing to the roughening operation, and again smoothening the higher areas and then lacquering the surface.

7. The herein described process of manufacturing artificial stone which consists in depositing a plurality of different and separated batches of differently colored or shaded material upon a surface, then smoothing the different batches to pull the batches together, then stippling the exposed surface of the mass, then allowing the same to become set or partially dry, then partially smoothing down the high points leaving sufficient crevices or holes, then distributing at random over such surface differently colored or shaded coatings, and then removing the coloring material from the high points of such surface and depositing it by wiping the same into the low spots or areas.

8. The herein described process of manufacturing artificial stone which consists in depositing a plurality of different and separated batches of differently colored or shaded material upon a surface, then smoothing the different batches to pull the batches together, then stippling the exposed surface of the mass, then allowing the same to become set or partially dry, then partially smoothing down the high points leaving sufficient crevices or holes, then distributing at random over such surface differently colored or shaded coatings, then removing the coloring material from the high points of such surface and depositing it by wiping the same into the low spots or areas, and then, when the surface is dry, removing by an abrading, or scraping operation the remaining portion of the coating from the high spots to cause the original base of the material to show at the high spots and a darker color in the low areas.

9. The herein described process of manufacturing artificial stone which consists in depositing a plurality of different and separated batches of differently colored or shaded material upon a surface, then smoothing the different batches to pull the batches together, then stippling the exposed surface of the mass, then allowing the same to become set or partially dry, then partially smoothing down the high points leaving sufficient crevices or holes, then distributing at random over such surface differently colored or shaded coatings, and then removing the coloring material from the high points of such surface and depositing it by wiping the same into the low spots or areas, the surface of the mass being lined at a predetermined time in the process, to represent blocks.

10. In a process of making imitation stone, the steps of applying on different areas of a carrier or support plastic materials in different shades of color with the surface which is to constitute the front of the product exposed, and filling from the front surface the voids between the areas of application by plastic masses of other shades of color, producing grooves in irregular arrangement on the surface of the plastic mass, and roughening the mass while it is still in plastic condition.

In witness whereof I affix my signature.

JOHN J. WEBER.